(12) United States Patent
Carobolante et al.

(10) Patent No.: US 10,199,871 B2
(45) Date of Patent: Feb. 5, 2019

(54) APPARATUS AND METHOD FOR WIRELESS POWER CHARGING OF SUBSEQUENT RECEIVER

(71) Applicant: QUALCOMM Incorporated, San Diego, CA (US)

(72) Inventors: Francesco Carobolante, San Diego, CA (US); William Henry Von Novak, III, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 15/197,407

(22) Filed: Jun. 29, 2016

(65) Prior Publication Data

US 2018/0006495 A1  Jan. 4, 2018

(51) Int. Cl.
| | |
|---|---|
| *H02J 7/00* | (2006.01) |
| *H02J 50/12* | (2016.01) |
| *H02J 7/02* | (2016.01) |
| *H02J 50/10* | (2016.01) |
| *H02J 50/80* | (2016.01) |
| *H02J 50/40* | (2016.01) |
| *H02J 50/90* | (2016.01) |

(52) U.S. Cl.
CPC .............. *H02J 50/12* (2016.02); *H02J 7/025* (2013.01); *H02J 50/10* (2016.02); *H02J 50/80* (2016.02); *H02J 50/40* (2016.02); *H02J 50/90* (2016.02); *H02J 2007/0096* (2013.01)

(58) Field of Classification Search
CPC ..................... H02J 50/00–50/90; H02J 7/025
USPC .......................................... 320/108; 307/104
See application file for complete search history.

(56) References Cited

U.S. PATENT DOCUMENTS

| | | | |
|---|---|---|---|
| 2013/0082653 A1* | 4/2013 | Lee ..................... | H02J 7/0027 320/108 |
| 2015/0372496 A1* | 12/2015 | Lee ..................... | H02J 50/40 307/104 |

OTHER PUBLICATIONS

International Search Report and Written Opinion—PCT/US2017/035399—ISA/EPO—dated Jul. 20, 2017.

* cited by examiner

*Primary Examiner* — Zixuan Zhou
(74) *Attorney, Agent, or Firm* — Hunter Clark PLLC

(57) ABSTRACT

An apparatus and method for transmission of wireless power to a plurality of chargeable devices. The apparatus and method include and provide for a wireless power transmitter including a power transmitting element configured to use a current at a first level to wirelessly transmit power sufficient to provide power to one or more chargeable devices positioned within a charging region. The apparatus and method further include and provide for a controller to detect a subsequent chargeable device positioned within the charging region and to adjust the current from the first level to a default level prior to communication with the subsequent chargeable device.

31 Claims, 6 Drawing Sheets

APPARATUS AND METHOD FOR WIRELESS POWER CHARGING OF SUBSEQUENT RECEIVER

TECHNICAL FIELD

The described technology generally relates to wireless power. More specifically, the disclosure is directed to devices, systems, and methods related to detection of accommodating a subsequent receiver in a wireless power magnetic field.

BACKGROUND

An increasing number and variety of electronic devices are powered via rechargeable batteries. Such devices include mobile phones, portable music players, laptop computers, tablet computers, computer peripheral devices, communication devices (e.g., BLUETOOTH devices), digital cameras, hearing aids, and the like. While battery technology has improved, battery-powered electronic devices increasingly require and consume greater amounts of power, thereby often requiring recharging. Rechargeable devices are often charged via wired connections that require cables or other similar connectors that are physically connected to a power supply. Cables and similar connectors may sometimes be inconvenient or cumbersome and have other drawbacks. Wireless power charging systems, for example, may allow users to charge and/or power electronic devices without physical, electrical connections, thus reducing the number of components required for operation of the electronic devices and simplifying the use of the electronic device. As such, wireless charging systems and methods that efficiently and safely transfer power for charging rechargeable electronic devices are desirable. Wireless power transfer systems include a power transmitting unit (e.g., a charging device or transmitter) and one or more power receiving units (e.g., a cellphone, a laptop, etc.) to be charged. The receiving units may be used to provide power to hardware and circuitry coupled to the receiving units. The power level transmitted by a transmitting unit may be adjusted to advantageously provide a preferred or sufficient power to the receiving units. The transmit power level may need to be readjusted upon the detection of configurations of various receiving units.

SUMMARY

An apparatus for wirelessly transferring power is provided. The apparatus comprises a wireless power transmitter including a power transmitting element configured to use a current at a first level to wirelessly transmit power sufficient to provide power to one or more chargeable devices positioned within a charging region. The apparatus further comprises a controller operationally coupled to the power transmitting element and configured to detect a subsequent chargeable device positioned within the charging region. The controller is further configured to adjust the current from the first level to a default level prior to communication with the subsequent chargeable device.

A method for wirelessly transferring power is provided. The method comprises wirelessly transmitting power from a power transmitting element, using a current at a first level, sufficient to provide power to one or more chargeable devices positioned within a charging region of the power transmitting element. The method further comprises detecting a subsequent chargeable device positioned within the charging region. The method further comprises adjusting the current from the first level to a default level prior to communication with the subsequent chargeable device.

An apparatus for wirelessly transferring power is provided. The apparatus comprises means for wirelessly transmitting power from a power transmitting element, using a current at a first level, sufficient to provide power to one or more chargeable devices positioned within a charging region of the power transmitting element. The apparatus further comprises means for detecting a subsequent chargeable device positioned within the charging region. The apparatus further comprises means for adjusting the current from the first level to a default level prior to communication with the subsequent chargeable device.

A non-transitory computer-readable medium is provided. The medium comprises code that, when executed, causes an apparatus to wirelessly transmit power from a power transmitting element, using a current at a first level, sufficient to provide power to one or more chargeable devices positioned within a charging region of the power transmitting element. The medium further comprises code that, when executed, causes an apparatus to detect a subsequent chargeable device positioned within the charging region. The medium further comprises code that, when executed, causes an apparatus to adjust the current from the first level to a default level prior to communication with the subsequent chargeable device.

Figure 1:
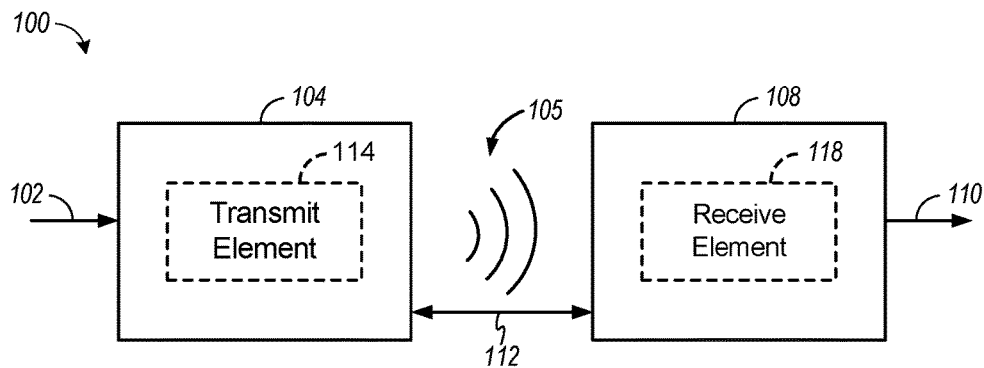
FIG. 1 is a functional block diagram of a wireless power transfer system in accordance with an illustrative embodiment.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of certain implementations and is not intended to represent the only implementations in which the embodiments may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the disclosed implementations. In some instances, some devices are shown in block diagram form.

Drawing elements that are common among the following figures may be identified using the same reference numerals.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "power receiving element" to achieve power transfer.

Loosely coupled wireless power transfer systems include a power transmitting unit (e.g., a charging device or transmitter) and one or more power receiving units (e.g., a cellphone, a laptop, etc.) to be charged. When a power receiving unit receives transferred power from the power transmitting unit, the level of transmitter power current may be overly high for an advantageously located power receiving unit. Therefore, the power transmitting unit may reduce the transmit power current level. However, the reduced transmit power current level may be insufficient for a subsequent additional power receiving unit that desires to join the wireless power transfer system. As such, it is desirable to provide sufficient power to the subsequent additional power receiving unit to enable the subsequent additional power receiving unit to be acknowledged and properly charged by the power transmitting unit.

FIG. 1 is a functional block diagram of a wireless power transfer system 100, in accordance with an illustrative embodiment. Input power 102 may be provided to a transmitter 104 from a power source (not shown in this figure) to generate a wireless (e.g., magnetic or electromagnetic) field 105 for performing energy transfer. A receiver 108 may couple to the wireless field 105 and generate output power 110 for storing by a device (not shown in this figure) coupled to the output power 110. The transmitter 104 and the receiver 108 may be separated by a distance 112. The transmitter 104 may include a power transmitting element 114 for transmitting/coupling energy to the receiver 108. The receiver 108 may include a power receiving element 118 for receiving or capturing/coupling energy transmitted from the transmitter 104.

In one illustrative embodiment, the transmitter 104 and the receiver 108 may be configured according to a mutual resonant relationship. When the resonant frequency of the receiver 108 and the resonant frequency of the transmitter 104 are substantially the same or very close, transmission losses between the transmitter 104 and the receiver 108 are reduced. As such, wireless power transfer may be provided over larger distances. Resonant inductive coupling techniques may thus allow for improved efficiency and power transfer over various distances and with a variety of inductive power transmitting and receiving element configurations.

In certain embodiments, the wireless field 105 may correspond to the "near field" of the transmitter 104. The near-field may correspond to a region in which there are strong reactive fields resulting from the currents and charges in the power transmitting element 114 that minimally radiate power away from the power transmitting element 114. The near-field may correspond to a region that is within about one wavelength (or a fraction thereof) of the power transmitting element 114.

In certain embodiments, efficient energy transfer may occur by coupling a large portion of the energy in the wireless field 105 to the power receiving element 118 rather than propagating most of the energy in an electromagnetic wave to the far field.

In certain implementations, the transmitter 104 may output a time varying magnetic (or electromagnetic) field with a frequency corresponding to the resonant frequency of the power transmitting element 114. When the receiver 108 is within the wireless field 105, the time varying magnetic (or electromagnetic) field may induce a current in the power receiving element 118. As described above, if the power receiving element 118 is configured as a resonant circuit to resonate at the frequency of the power transmitting element 114, energy may be efficiently transferred. An alternating current (AC) signal induced in the power receiving element 118 may be rectified to produce a direct current (DC) signal that may be provided to charge or to power a load.

Figure 2:
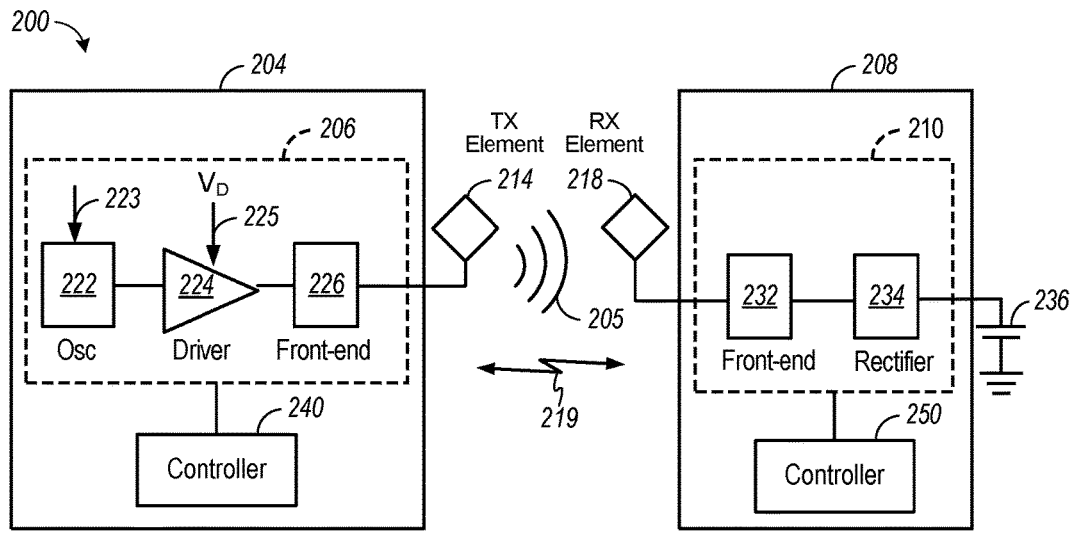
FIG. 2 is a functional block diagram of a wireless power transfer system in accordance with an illustrative embodiment.

FIG. 2 is a functional block diagram of a wireless power transfer system 200, in accordance with another illustrative embodiment. The system 200 may include a transmitter 204 and a receiver 208. The transmitter 204 (also referred to herein as power transfer unit, PTU) may include transmit circuitry 206 that may include an oscillator 222, a driver circuit 224, and a front-end circuit 226. The oscillator 222 may be configured to generate an oscillator signal at a desired frequency that may adjust in response to a frequency control signal 223. The oscillator 222 may provide the oscillator signal to the driver circuit 224. The driver circuit 224 may be configured to drive the power transmitting element 214 at, for example, a resonant frequency of the power transmitting element 214 based on an input voltage signal (VD) 225. The driver circuit 224 may be a switching amplifier configured to receive a square wave from the oscillator 222 and output a sine wave.

The front-end circuit 226 may include a filter circuit configured to filter out harmonics or other unwanted frequencies. The front-end circuit 226 may include a matching circuit configured to match the impedance of the transmitter 204 to the impedance of the power transmitting element 214. As will be explained in more detail below, the front-end circuit 226 may include a tuning circuit to create a resonant circuit with the power transmitting element 214. As a result of driving the power transmitting element 214, the power transmitting element 214 may generate a wireless field 205 to wirelessly output power at a level sufficient for charging a battery 236, or otherwise powering a load.

The transmitter 204 may further include a controller 240 operably coupled to the transmit circuitry 206 and configured to control one or more aspects of the transmit circuitry 206, or accomplish other operations relevant to managing the transfer of power. The controller 240 may be a microcontroller or a processor. The controller 240 may be implemented as an application-specific integrated circuit (ASIC). The controller 240 may be operably connected, directly or indirectly, to each component of the transmit circuitry 206. The controller 240 may be further configured to receive information from each of the components of the transmit circuitry 206 and perform calculations based on the received information. The controller 240 may be configured to generate control signals (e.g., frequency control signal 223) for each of the components that may adjust the operation of that component. As such, the controller 240 may be configured to adjust or manage the power transfer based on a result of the operations performed by it. The transmitter 204 may further include a memory (not shown) configured to store data, for example, such as instructions for causing the controller 240 to perform particular functions, such as those related to management of wireless power transfer.

The receiver 208 (also referred to herein as power receiving unit, PRU) may include receive circuitry 210 that may include a front-end circuit 232 and a rectifier circuit 234. The front-end circuit 232 may include matching circuitry configured to match the impedance of the receive circuitry 210 to the impedance of the power receiving element 218. As will be explained below, the front-end circuit 232 may further include a tuning circuit to create a resonant circuit with the power receiving element 218. The rectifier circuit 234 may generate a DC power output from an AC power input to charge the battery 236, as shown in FIG. 2. The receiver 208 and the transmitter 204 may additionally communicate on a separate communication channel 219 (e.g., BLUETOOTH, ZIGBEE, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236. In certain embodiments, the transmitter 204 may be configured to generate a predominantly non-radiative field with a direct field coupling coefficient (k) for providing energy transfer. Receiver 208 may directly couple to the wireless field 205 and may generate an output power for storing or consumption by a battery (or load) 236 coupled to the output or receive circuitry 210.

The receiver 208 may further include a controller 250 configured similarly to the transmit controller 240 as described above for managing one or more aspects of the wireless power receiver 208. The receiver 208 may further include a memory (not shown) configured to store data, for example, such as instructions for causing the controller 250 to perform particular functions, such as those related to management of wireless power transfer.

As discussed above, transmitter 204 and receiver 208 may be separated by a distance and may be configured according to a mutual resonant relationship to minimize transmission losses between the transmitter 204 and the receiver 208.

Figure 3:
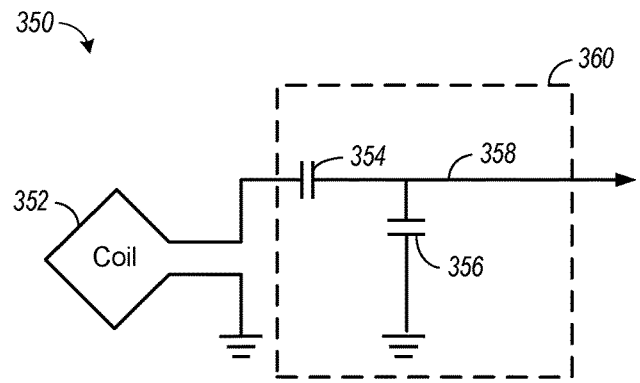
FIG. 3 is a schematic diagram of a portion of transmit circuitry or receive circuitry of FIG. 2 including a power transmitting or receiving element in accordance with an illustrative embodiment.

FIG. 3 is a schematic diagram of a portion of the transmit circuitry 206 or the receive circuitry 210 of FIG. 2, in accordance with illustrative embodiments. As illustrated in FIG. 3, transmit or receive circuitry 350 may include a power transmitting or receiving element 352 and a tuning circuit 360. The power transmitting or receiving element 352 may also be referred to or be configured as an antenna or a "loop" element. The terms "power transmitting element" and "power receiving element" generally refer to components that may respectively wirelessly output or receive energy for coupling to another antenna or element. The power transmitting or receiving element 352 may also be referred to herein or be configured as a "magnetic" antenna, or an induction coil, a resonator, or a portion of a resonator. The power transmitting or receiving element 352 may also be referred to as a coil or resonator of a type that is configured to wirelessly output or receive power. As used herein, the power transmitting or receiving element 352 is an example of a "power transfer component" of a type that is configured to wirelessly output and/or receive power. The power transmitting or receiving element 352 may include an air core or a physical core such as a ferrite core (not shown in this figure).

When the power transmitting or receiving element 352 is configured as a resonant circuit or resonator with tuning circuit 360, the resonant frequency of the power transmitting or receiving element 352 may be based on the inductance and capacitance. Inductance may be simply the inductance created by a coil and/or other inductor forming the power transmitting or receiving element 352. Capacitance (e.g., a capacitor) may be provided by the tuning circuit 360 to create a resonant structure at a desired resonant frequency. As a non-limiting example, the tuning circuit 360 may comprise a capacitor 354 and a capacitor 356, which may be added to the transmit and/or receive circuitry 350 to create a resonant circuit.

The tuning circuit 360 may include other components to form a resonant circuit with the power transmitting or receiving element 352. As another non-limiting example, the tuning circuit 360 may include a capacitor (not shown) placed in parallel between the two terminals of the transmit and/or receive circuitry 350. Still other designs are possible. In some embodiments, the tuning circuit in the front-end circuit 226 may have the same design (e.g., 360) as the tuning circuit in front-end circuit 232. In other embodiments, the front-end circuit 226 may use a tuning circuit design different than in the front-end circuit 232.

For power transmitting elements, the signal 358, with a frequency that substantially corresponds to the resonant frequency of the power transmitting or receiving element 352, may be an input to the power transmitting or receiving element 352. For power receiving elements, the signal 358, with a frequency that substantially corresponds to the resonant frequency of the power transmitting or receiving element 352, may be an output from the power transmitting or receiving element 352. Although aspects disclosed herein may be generally directed to resonant wireless power transfer, persons of ordinary skill will appreciate that aspects disclosed herein may be used in non-resonant implementations for wireless power transfer.

Figure 4:
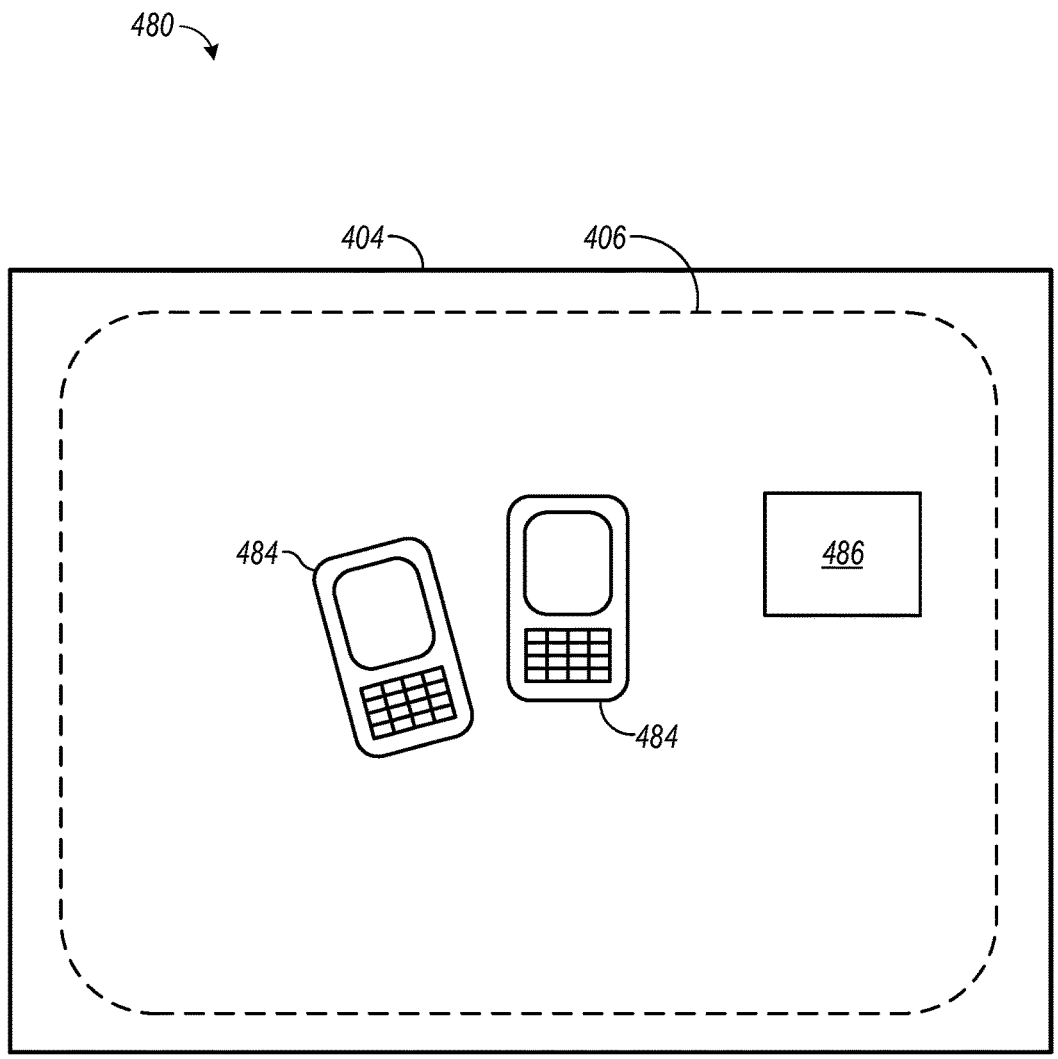
FIG. 4 illustrates a wireless power transfer system including a wireless power transmitter and receivers, according to an exemplary embodiment.

FIG. 4 illustrates a wireless power transfer system 480 including a power transmitting unit "PTU" 404 (e.g., a power transmitting unit that provides wireless charging) and one or more power receiving units "PRUs" 484 (e.g., power receiving units that are wirelessly chargeable devices), according to an exemplary embodiment. PTU 404 may create a magnetic field energy about a space or region, hereinafter referred to as a charging region 406. The magnetic field energy couples to PRU 484. PRU 484 may convert magnetic field energy received from PTU 404 into electrical energy. PRUs 484 may include devices such as cellular phones, portable music players, computers, laptop computers, tablet computers, computer peripheral devices, communication devices (e.g., BLUETOOTH headsets), digital cameras, hearing aids (and other medical devices), etc. In one embodiment, PRU 484 may be connected to a device to be charged which draws on the electrical energy. In another embodiment, the device to be charged may be integrated into PRU 484. PRU 484 may be placed on PTU 404 for the purpose of charging PRU 484. In one embodiment, PTU 404 and PRU 484 may communicate via a BLUETOOTH Low Energy (BLE) link.

In one embodiment, the wireless power transfer system 480 further includes a disadvantaged PRU 486 (e.g., headphones, Internet Of Things (IOT) devices, smartphone, etc.), which may be configured with a smaller element or antenna. The disadvantaged PRU 486 may also be configured as a smaller device having a smaller receive coil, which means less area over which to average the magnetic field. Alternatively, the disadvantaged PRU 486 may be a device similar to PRU 484 that is arranged in a less favorable location within PTU 404, such as located near a fringe area of the magnetic field energy generated by PTU 404. Disadvantaged PRU 486 may observe more variation in the magnetic field and consequently a wider variation in voltage generated at the disadvantaged PRU 486. Accordingly, at the extremes of non-uniform fields and operating current, the disadvantaged PRU 486 may see voltages so low that the disadvantaged PRU 486 cannot boot, or voltages so high that the PRU 486 may be damaged.

In one embodiment further described below, PTU 404 is configured to adjust the transmit current thereby increasing the strength of the magnetic field energy allowing PRU 486 to boot and communicate with PTU 404. Once communication between PTU 404 and PRU 486 is established, PRU 486 may negotiate a favorable strength of magnetic field energy for favorable wireless charging.

Figure 5:
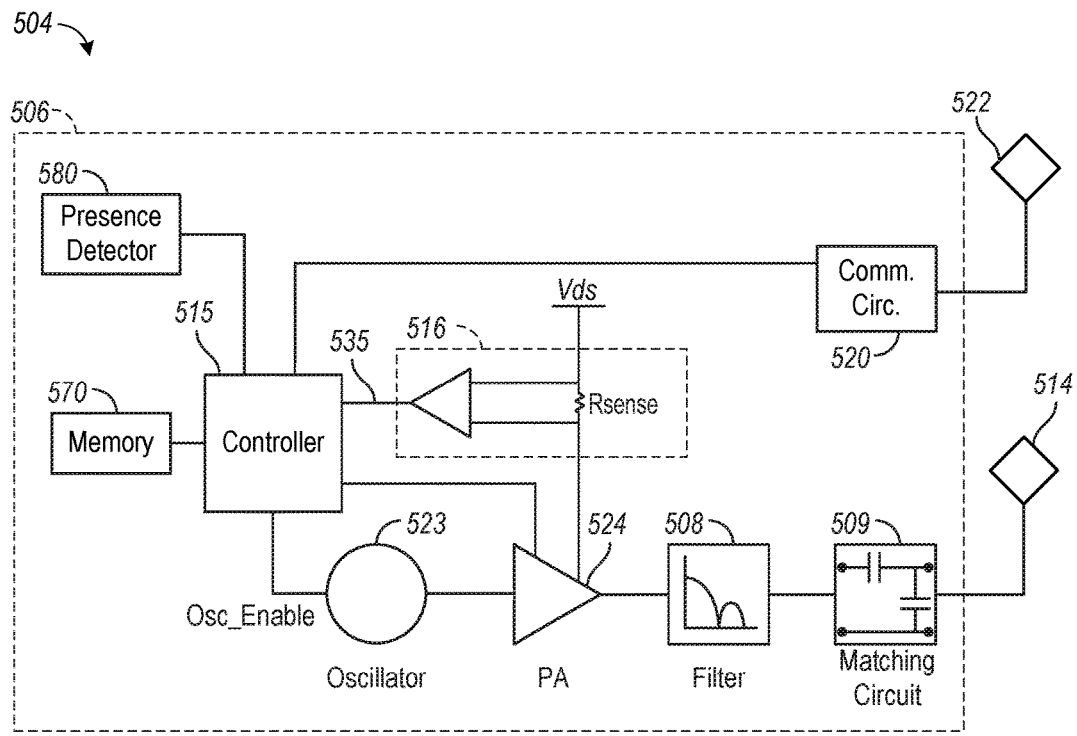
FIG. 5 is a functional block diagram of a transmitter that may be used in the wireless power transfer system of FIG. 1, in accordance with exemplary embodiments.

FIG. 5 is a functional block diagram of a PTU 504 (such as PTU 404) that may be used in the wireless power transfer system of FIG. 1, in accordance with exemplary embodiments. PTU 504 may receive power through a number of power sources, (e.g., an AC-DC converter (not shown)) to convert AC power present in a building, a DC-DC converter (not shown) to convert a DC power source to a voltage suitable for PTU 504, or directly from a conventional DC power source (not shown).

PTU 504 may include a power transmitting element 514 for generating electromagnetic or magnetic field energy about a space or region, referred to as a charging region. Power transmitting element 514 may be a transmit coil (e.g., an induction coil), or any other suitable device to wirelessly output power and configured to use current at various levels to wirelessly transmit power sufficient to provide power to one or more chargeable devices positioned within a charging region.

In an exemplary embodiment, power transmitting element 514 (or another antenna) may transmit power to a receiver device (e.g., the PRU 484/486) within, near, or around the charging region. In an exemplary embodiment, power transmitting element 514 (or another antenna) may receive an acknowledgement from PRU 484/486 regarding an amount of power the PRU has received. Power transmitting element 514 (or another antenna) may also receive information from PRU 484/486 about the various capabilities and specifications of PRU 484/486, as described below. Power transmitting element 514 (or another antenna) may also receive confirmation from PRU 484/486 that PRU 484/486 is fully or partially charged. In one embodiment, power transmitting element 514 (or another antenna) may communicate with PRU 484/486 via a BLUETOOTH Low Energy (BLE) link.

PTU 504 may further include transmit circuitry 506. The transmit circuitry 506 may include an oscillator 523 for generating oscillating signals (e.g., AC signals). Transmit circuitry 506 may provide AC power to power transmitting element 514 via the AC signals, resulting in generation of the magnetic field energy about power transmitting element 514. PTU 504 may operate at any suitable frequency, e.g., the 6.78 MHz ISM band.

Transmit circuitry 506 may include a fixed impedance matching circuit 509 for matching the impedance of the transmit circuitry 506 (e.g., 50 ohms) to the impedance of the power transmitting element 514. Transmit circuitry 506 may also include a low pass filter (LPF) 508 configured to reduce harmonic emissions to levels that prevent self-jamming of PRUs 484/486. Other exemplary embodiments may include different filter topologies, such as notch filters that attenuate specific frequencies while passing others. Transmit circuitry 506 may further include a driver circuit 524 configured to drive the AC signals. Other exemplary embodiments may include an adaptive impedance match that may be varied based on measurable transmit metrics, such as output power to power transmitting element 514 or DC current to driver circuit 524. Transmit circuitry 506 may further comprise discrete devices, discrete circuits, and/or an integrated assembly of components. An exemplary AC power output from power transmitting element 514 may be from 0.3 watts to 20 watts or may also be a higher or lower value.

Transmit circuitry 506 may further include a controller 515 configured for, among other functions, selectively enabling the oscillator 523 during transmit phases (or duty cycles) of the PRUs 484/486. Controller 515 may also be configured to adjust the frequency or phase of oscillator 523. Adjusting the phase of oscillator 523 and related circuitry in the transmission path may allow for reduction of out-of-band emissions, especially when transitioning from one frequency to another. Controller 515 may also be configured to adjust the output power level of oscillator 523 to implement a communication protocol for interacting with PRUs 484/486.

Controller 515 may also be configured to perform calculations based on data it sends and receives from other components in transmit circuitry 506. For use in those calculations, transmit circuitry 506 may also include a memory 570 for temporarily or permanently storing data. Memory 570 may also store various specifications of the components of PTU 504 and/or PRUs 484/486 for use in calculations as described below.

Controller 515 may be configured to gather and track information about the whereabouts and status of PRUs 484/486 that may be associated with PTU 504. Thus, transmit circuitry 506 may include a presence detector 580 (e.g., an impedance detector, a motion detector, etc.) to detect the initial presence of a PRU 484/486 when the PRU enters the charging region. Detection of PRU 484/486 causes PTU 504 to activate. Presence detector 580 may detect PRU 484/486 via power transmitting element 514 or another appropriate antenna not shown in FIG. 5. Controller 515 may adjust the amount of power going to driver circuit 524 in response to presence signals from presence detector 580. Power transmitting element 514 may then generate the magnetic field energy for transferring power to PRU 484/486.

Transmit circuitry 506 may further include a load sensing circuit 516 for monitoring the current flowing to driver circuit 524, which may be affected by the presence or absence of PRUs 484/486. Controller 515 may also be configured to sense or detect load changes on driver circuit 524 to determine whether to enable oscillator 523.

Transmit circuitry 506 may further include communication circuitry 520 including antenna 522 for engaging in a low-power communication with PRUs. By way of example, communication circuitry 520 may be compatible with one of several communication standards including a BLUETOOTH Low Energy (BLE). Communication circuitry 520 may further facilitate communication according to protocols compatible with an industry standard such as the AIRFUEL ALLIANCE standard. Antenna 522 is operationally coupled to controller 515, here through communication circuitry 520, such that a signal sent by controller 515 may result in a signal received by antenna 522 and/or a signal sent by antenna 522 may result in a signal received by controller 515.

Figure 6:
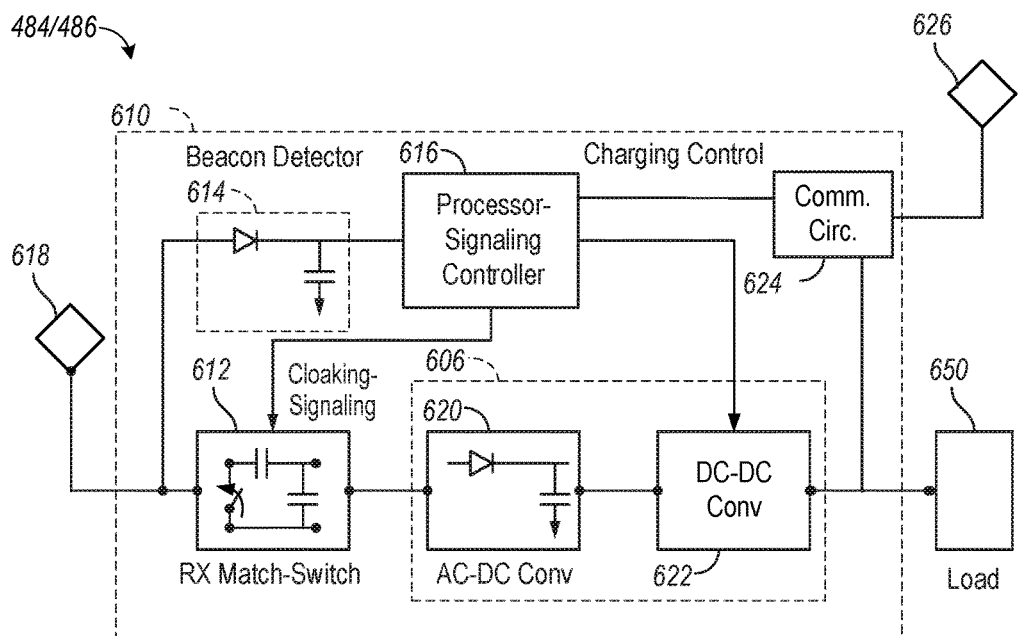
FIG. 6 is a functional block diagram of a receiver that may be used in the wireless power transfer system of FIG. 1, in accordance with exemplary embodiments.

FIG. 6 is a functional block diagram of PRU 484/486 (FIG. 4) that may be used in the wireless power transfer system of FIG. 1, in accordance with exemplary embodiments. PRU 484/486 may include receive circuitry 610 comprising various components of PRU 484. Receive circuitry 610 may include a power receiving element 618 for receiving power from a power transmitting element (e.g., the power transmitting element 514 of FIG. 5). PRU 484/486 may further couple to a load 650 for providing received power thereto. Load 650 may be external to PRU 484/486, or load 650 may be integrated into PRU 484/486 (not shown). Receive circuitry 610 may further include a processor 616 for coordinating the processes of PRU 484/486, as described below.

Power receiving element 618 may be tuned to resonate at a similar frequency, or within a specified range of frequencies, as power transmitting element 514 (FIG. 5). Power receiving element 618 may be similarly dimensioned with power transmitting element 514 or may be differently sized based on the dimensions of load 650. In one embodiment, power receiving element 618 may communicate with power transmitting element 514 via a BLUETOOTH Low Energy (BLE) link allowing PRU 484 to send feedback data to PTU 504. The feedback data may allow PTU 504 to vary the strength of its magnetic field to adjust the electrical energy being transferred to PRU 484.

To transmit power to load 650, the energy from power transmitting element 514 may be propagated wirelessly to power receiving element 618 and then coupled through the rest of the receive circuitry 610 to the load 650. For more efficient power transfer, receive circuitry 610 may provide an impedance match to power receiving element 618. Receive circuitry 610 may include power conversion circuitry 606 for converting a received AC energy source into charging power for use by load 650. Power conversion circuitry 606 may include an AC-to-DC converter 620 to rectify the magnetic field energy received at the power receiving element 618 into a non-alternating power with an output voltage. AC-to-DC converter 620 may be a partial or full rectifier, a regulator, a bridge, a doubler, a linear or switching converter, etc. Power conversion circuitry 606 may also include a DC-to-DC converter 622 (or other power regulator) to convert the rectified AC energy signal into an energy potential (e.g., voltage) that is compatible with load 650.

Receive circuitry 610 may further include switching circuitry 612 for connecting or disconnecting power receiving element 618 to or from the power conversion circuitry 606. Disconnecting power receiving element 618 from the power conversion circuitry 606 may suspend charging of load 650 and/or change load 650 as seen by PTU 504. When multiple PRUs 484 are present in the PTU 504 charging field, the processor 616 may be configured to time-multiplex (e.g., switch) the loading and unloading of one or more PRUs 484 to enable other PRUs 484 to more efficiently couple to PTU 504.

Further communication between PTU 504 and PRU 484 may include in-band signaling using the coupling field. PTU 504 may use on/off keying of the transmitted signal to adjust whether energy is available in the near-field. PRU 484 may interpret these changes in energy as a message from PTU 504. From the receiver side, PRU 484 may use tuning and de-tuning of the power receiving element 618 to adjust how much power is being accepted from the field. In some cases, the tuning and de-tuning may be accomplished via the switching circuitry 612. PTU 504 may detect this difference in power used from the field and interpret these changes as a message from PRU 484. Other forms of modulation of the transmit power and load 650 behavior may be utilized.

Receive circuitry 610 may further include signaling and beacon detector circuitry 614 to identify received energy fluctuations that may be informational signaling from PTU 504 to PRU 484. Processor 616 may monitor the signaling and beacon detector circuitry to determine a beacon state and extract messages sent from PTU 504. Furthermore, signaling and beacon detector circuitry 614 may be used to detect the transmission of a reduced AC signal energy (e.g., a beacon signal). Signaling and beacon detector circuitry 614 may further rectify the reduced AC signal energy into power sufficient for awakening either un-powered or power-depleted circuits within receive circuitry 610 in order to configure receive circuitry 610 for wireless charging.

Receive circuitry 610 may further include communication circuitry 624 including antenna 626 for engaging in a low-power communication with PRUs. By way of example, communication circuitry 624 may be compatible with one of several communication standards including a BLUETOOTH Low Energy (BLE). Communication circuitry 624 may further facilitate communication according to protocols compatible with an industry standard such as the AIRFUEL ALLIANCE.

Figure 7:
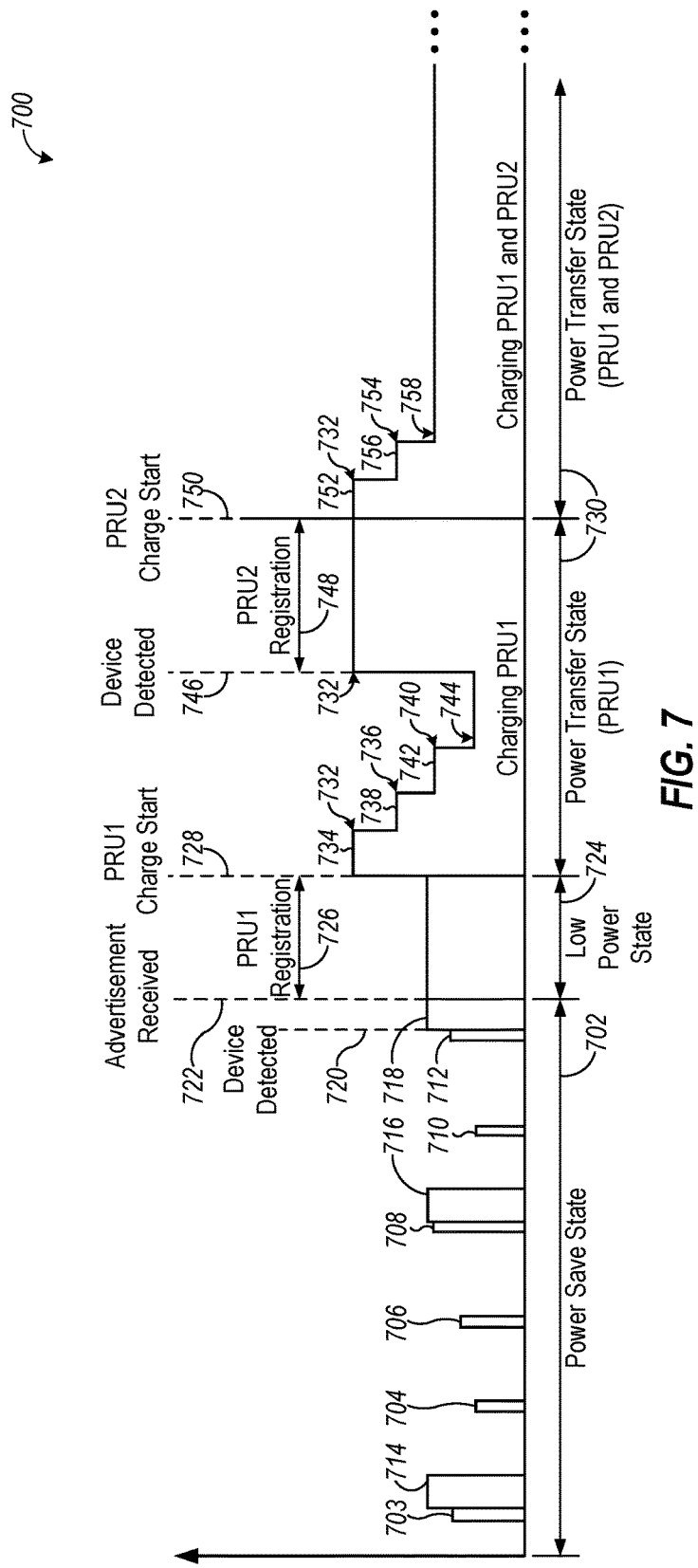
FIG. 7 is a transmit current timing diagram of a wireless power transmitter, in accordance with exemplary embodiments.

FIG. 7 is a transmit current timing diagram of a wireless power transmitter illustrating wireless power transfer to wirelessly chargeable devices, in accordance with an embodiment. In FIG. 7, the y-axis illustrates current levels provided to a power transmitting element 514 (FIG. 5) corresponding to a relative amount of wireless magnetic field energy generated in a charging region of a PTU. The x-axis illustrates time.

PTU 504 (FIG. 5) initiates a method 700 of wireless power transmission by entering a Power Save state 702. The Power Save state 702 is a period where controller 515 causes impedance-determining pulses and start-up-charge pulses to be generated by the power transmitting element 514 which may be of varying power levels to evaluate the charging region of PTU 504. The impedance-determining pulses correspond to "short beacon" signals and the start-up-charge pulses correspond to "long beacon" signals. Short beacons provide enough power to make impedance determinations but less power than a charging power, i.e., provide insufficient power to charge a chargeable device in the charging region. These may be transmitted intermittently or periodically (e.g., driving the power transmit element 514 with a level of current for a small portion of a total duty cycle). Long beacons provide an amount of power that is between short beacon power level and the charging power and that is sufficient to start communication circuitry of a chargeable device in the charging region to enable the chargeable device to establish a communication link with the device transmitting the long beacons, e.g., PTU 504. The power transmitting element 514 transmits short beacons 703-712 in Power Save state 702. While in the Power Save state, the controller 515 is configured to detect/determine changes to the impedance or any load modulation occurring in the charging region. PTU 504, e.g., controller 515, is configured to detect changes in impedance presented to PTU 504. If an impedance change (e.g., above a threshold) or a load presence is detected in the charging region representative of, for example, a first PRU (e.g., first chargeable device), then power transmitting element 514 generates a long beacon, such as long beacons 714-718. The long beacon may be concatenated with a short beacon to cause communication circuitry 624 (FIG. 6) at first PRU 484 to energize its low power wireless communication circuitry 624.

More specifically, power transmitting element 514 transmits a short beacon 712 and the controller 515 detects an impedance change at time 720. PTU 504 then transmits long beacon 718 allowing the first chargeable device (PRU) 484 to power up communication circuitry 624 and controller 616. At a time 722, the communication circuit 520 receives a response (e.g., an advertisement) from first chargeable device (PRU) 484. Once the advertisement from PRU 484 is received by the communication circuit 520, Power Save state 702 ends and Low Power state 724 begins. During Low Power state 724, the controller 515 is configured to maintain the power level for a period of time 726 during which first chargeable device (PRU) 484 (FIG. 4) engages in a registration process with PTU 504. The registration process allows first chargeable device (PRU) 484 and PTU 504 to exchange status and capabilities with each other. When the registration process ends at a time 728, the controller 515 transitions from Low Power state 724 to a Power Transfer state 730. During Power Transfer state 730, the controller 515 is configured to adjust the current level to the power transmitting element 514 to provide an efficient power level in the charging region as continuously evaluated by first chargeable device (PRU) 484 and controller 515. The controller 515 provides a default level of current 732 initially for a period 734 while the processes, for example processes in an industry standard such as the AIRFUEL ALLIANCE, cooperatively adjust the current in the power transmitting element to adapt to a more efficient value. In response to the cooperative evaluation in the present example, the controller 515 determines to reduce the current provided to the power transmitting element 514 to a first adjusted level 736 for a period 738. In further response to the cooperative evaluation in the present example, the controller 515 determines to reduce the current provided to the power transmitting element 514 to a second adjusted level 740 for a period 742. This evaluation process may occur continuously during Power Transfer state 730. In the present example, the controller 515 determines to further reduce the current provided to the power transmitting element 514 to a final adjusted level 744 for a continuing period.

During Power Transfer state 730, the controller 515 is configured to continue through the detection of impedance changes or through other detection techniques to identify the presence of any subsequent chargeable device (PRU) 486 placed in the charging region. Generally, a subsequent chargeable device (PRU) 486 (FIG. 4) placed in the charging region would receive sufficient field energy to power up the respective low power communication circuitry 624 (FIG. 6) to identify itself and negotiate a compromised level of current in the power transmitting element to favorably charge both first chargeable device (PRU) 484 and the subsequent chargeable device (PRU) 486. However, when the current level for wirelessly transmitting power to first chargeable device (PRU) 484 has been reduced to, for example, a level 744, many types of subsequent chargeable devices (PRU) 486 may not receive a sufficient level of wireless power to awake and communicate with communication circuit 520 of the PTU 504. Alternatively, a subsequent chargeable device (PRU) 486 may be placed in a location within the charging region that provides an insufficient level of wireless power to awake and communicate with PTU 504. Specifically, smaller subsequent chargeable devices may have smaller receive coils, which means less area for averaging the H-field. Accordingly, smaller subsequent chargeable devices may see more variation in the H-field and consequently a wider variation in voltage at the subsequent chargeable device. At the extremes of field non-uniformity and operating current, a subsequent chargeable device could see voltages from levels of power transmitting element current sufficiently low to prevent them from booting or so high that damage may result.

According to method 700, when the controller 515, at a time 746, detects subsequent chargeable device (PRU) 486 through, for example, detecting an impedance change in the chargeable region, the controller 515 returns the current through the power transmitting element 514 to the default level of current 732 for a period 748 allowing the subsequent chargeable device (PRU) 486 to power up the communication circuitry 624 and controller 616. The controller 515 maintains the power level for a period of time 748 during which the subsequent chargeable device (PRU) 486 engages in a registration process with PTU 504 via the communication circuit 520 and controller 515. The registration process allows subsequent chargeable device (PRU) 486 and PTU 504 to exchange status and capabilities with each other. When the registration process ends at a time 750, while in Power Transfer state 730, the controller 515 is configured to adjust the current level to the power transmitting element 514 to provide an efficient power level in the charging region for both first chargeable device 484 and subsequent chargeable device 486. Continuing, the controller 515 provides a default level of current 732 for a period 752 while the processes, for example processes in an industry standard such as the AIRFUEL ALLIANCE, cooperatively adjust the current in the power transmitting element to adapt to a more efficient value. In response to the cooperative evaluation in the present example, the controller 515 reduces the current provided to the power transmitting element 514 to a first adjusted level 754 for a period 756. In further response to the cooperative evaluation in the present example, the controller 515 determines to reduce the current provided to the power transmitting element 514 to a second adjusted level 758 for a continuing period. This evaluation process may occur continuously during Power Transfer state 730.

Figure 8:
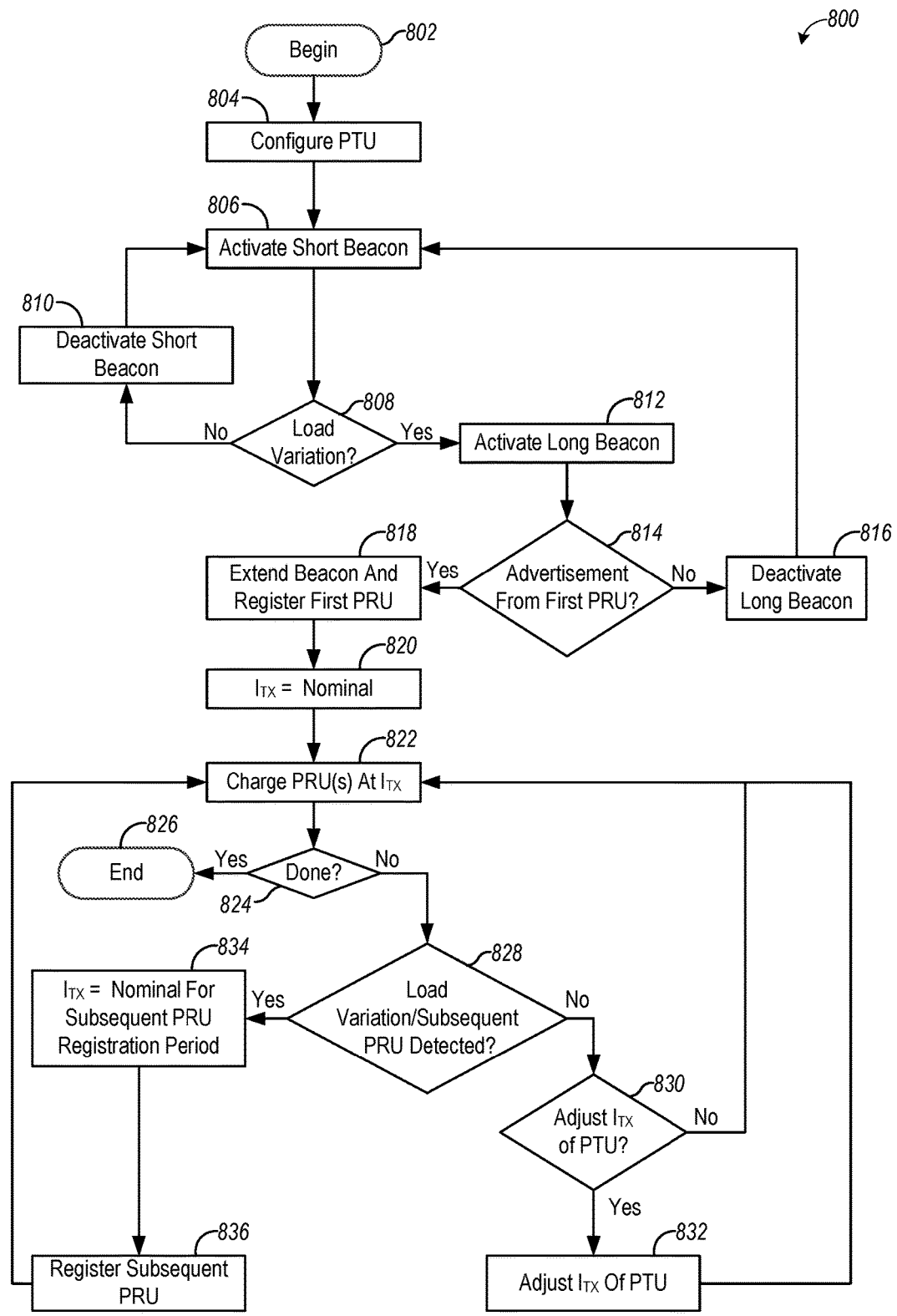
FIG. 8 is a flowchart of an exemplary process to adjust current levels for a wireless power transmitter, in accordance with exemplary embodiments.

FIG. 8 illustrates a flowchart 800 of an exemplary method for controller 515 (FIG. 5) to provide wireless power to wirelessly chargeable devices including a subsequent chargeable device that is placed in a charging region while wireless charging of another chargeable device is underway. At block 802, the method begins for PTU 504 to charge a first chargeable device (PRU) 484 and then additionally wirelessly charge a subsequent chargeable device (PRU) 486. At block 804, the controller 515 performs initial startup and configuration processes that may be unique to specific implementations. At block 806, the controller 515 of PTU 504 initiates short beacons 703-712 (FIG. 7) for the purpose of detecting changes in impedance presented to the power transmitting element 514 caused by the placement of a chargeable device in the charging region. At decision block 808, the controller 515 determines if a load variation (e.g., impedance change above a threshold) has occurred. If no load variation has occurred, then at block 810, the controller 515 deactivates the short beacon and the activation recurs at block 806.

If at decision block 808 the controller 515 detects a load variation consistent with placement of a first chargeable device (PRU) within the charging region 406, then at block 812 the controller 515 activates a long beacon 714-718 for the purpose of providing a detected chargeable device (PRU) 484 with sufficient power to boot and respond (e.g., send an advertisement) to the communication circuitry 520 of PTU 504. At decision block 814, the controller 515 determines if an advertisement is received via the communication circuit 520. If an advertisement is not received, then at block 816 the controller 515 deactivates the long beacon. If an advertisement is received from chargeable device (PRU) 484, then the controller 515 extends the long beacon as indicated in block 818 which allows sufficient power for the first chargeable device (PRU) 484 to register with PTU 504.

At block 820, the controller 515 sets the level for the amount of current through the power transmitting element or transmit coil of PTU 504 to default amount, $I_{TX\_default}$. The default current level varies with different power transmitting element sizes, charging region dimensions, and capabilities of chargeable devices (PRUs). Generally, the default current level is sufficient to allow a chargeable device (PRU) 484/486 placed anywhere within the charging region to boot up and respond with, for example, an advertisement to PTU 504. The default current level may refer to a predetermined or otherwise particularly set or fixed level of current that may be used during an initial state or reverted to when subsequent devices are detected as described herein. For example the default current level in some implementations may be a predetermined level that is independent from feedback from one or more chargeable devices or PRUs in the charging region. At block 822, the power transmitting element 514 generates a magnetic field within the charging region based upon the level of transmit current $I_{TX}$. Initially, $I_{TX}$ will be the default $I_{TX}$, however, $I_{TX}$ may be adjusted to other levels as described herein. The field generated by $I_{TX}$ enables chargeable device(s) (PRU(s)) in the charging region to be charged or powered.

At decision block 824, the controller 515 determines if wireless charging of the chargeable device(s) (PRU(s)) is complete. Signaling techniques may be used by chargeable device(s) (PRU(s)) to request the controller 515 to suspend generation of the field for wireless charging. Wireless charging may then end at block 826 as the controller 515 disables power transfer. If at decision block 824 the controller 515 determines that charging is not complete, then at block 828, the controller 515 periodically monitors for load variations corresponding to detection of a subsequent chargeable device (PRU) 486 being placed in the charging region of PTU 504 (e.g., determine if an impedance change presented to the wireless power transmitting element 514 is above a threshold). If a load variation is not detected, at decision block 830, the controller 515 determines if an adjustment to the transmit current $I_{TX}$ has been negotiated between chargeable device(s) (PRU(s)) and PTU 504. If no adjustment is outstanding, then charging continues at block 822. If at decision block 830 the controller 515 identifies a negotiated adjustment to the transmit current $I_{TX}$, then at block 832 the controller 515 adjusts the transmit current $I_{TX}$ of the power transmitting element 514 and charging continues with the adjusted transmit current $I_{TX}$ at block 822. This adjusted transmit current $I_{TX}$ may correspond to a first level, different than the default level which is adjusted in response to any requests in changes in power received via the communication circuitry 520.

When the controller 515 identifies a load variation consistent with a subsequent chargeable device (PRU) 486 being placed in the charging region of PTU 504 at decision block 828, then the controller 515 at block 834 adjusts the transmit current $I_{TX}$ to the default level thereby providing a sufficient field to allow the subsequent chargeable device (PRU) 486 to boot and respond. For example, the controller 515 adjusts the current to the default level for a period of time sufficient to enable the subsequent chargeable device to communication with PTU 504. Subsequent chargeable device (PRU) 486 engages in a registration with the controller 515 via communication circuitry 520 at block 836. Additionally, charging of chargeable device(s) (PRU(s)) within the chargeable region then continue to be charged in block 822, but at the default current level of $I_{TX}$ rather than at any previously adjusted current levels. For example, after the subsequent chargeable device (PRU) 486 has registered, further communication may occur between the chargeable devices 484 and 486, and the controller 515 may adjust the current to a second current level (e.g., different than the default level and different from the level of current provided before the subsequent device was placed) based on the capabilities of the multiple chargeable devices including the subsequent chargeable device (PRU) 486. As stated, when a subsequent (second, third or more) chargeable device (PRU) 486 is placed within the chargeable region of a PTU 504 and a currently charging chargeable device (PRU) 484 has negotiated an adjusted transmit current $I_{TX}$ that is less than the default transmit current, then the generated magnetic field may be insufficient for a poorly placed chargeable device (PRU) or for a chargeable device (PRU) that may have smaller or less capable receive circuitry. The present embodiment returns the transmit current to at least a default level to enable the disadvantaged chargeable device (PRU) to boot and respond. A similar case may arise when the adjusted current level of $I_{TX}$ is rather large and the generated magnetic field may be excessive for a newly added chargeable device (PRU), which may have a more sensitive receive circuitry or may be placed in an area where the local field is relatively high. In this case the internal protection circuitry of the chargeable device (PRU) may prevent proper activation of the charging circuitry. Also in this case, following the detection of the device, the current level of $I_{TX}$ is brought back to the default value, e.g., by controller 515, thus allowing for proper registration of the device.

Figure 9:
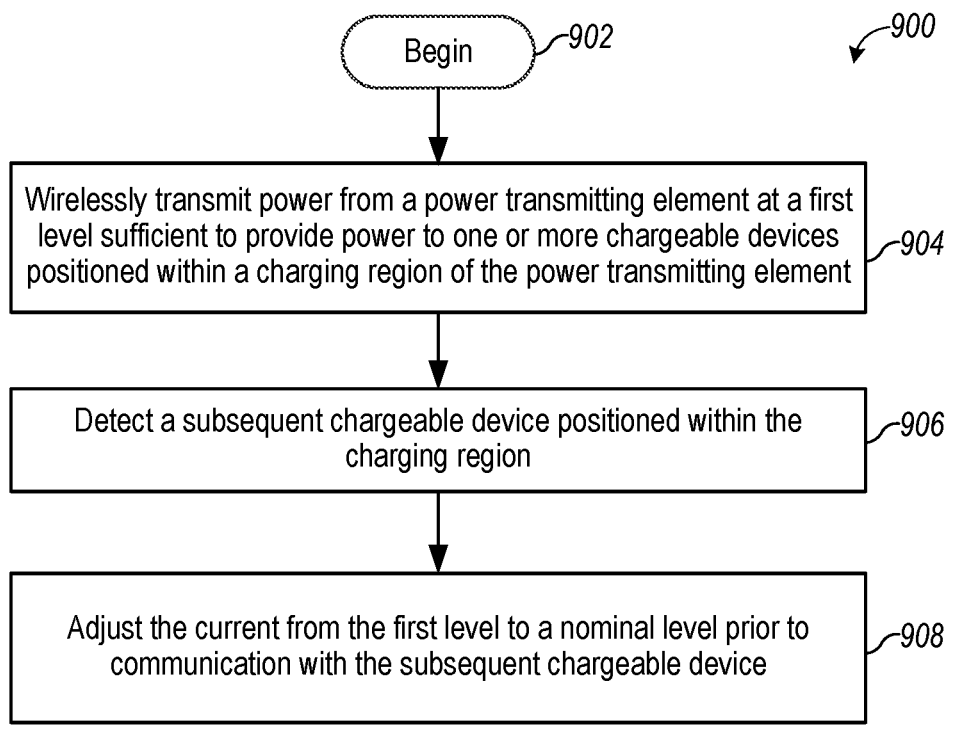
FIG. 9 is a flowchart of an exemplary method for wirelessly transferring power, in accordance with exemplary embodiments.

FIG. 9 illustrates a flowchart 900 of a method for wirelessly charging a plurality of wirelessly chargeable devices, in accordance with an embodiment. Method 900 may be included within a standard wireless charging standard, including the AIRFUEL ALLIANCE, that may preclude disadvantaged chargeable devices from properly booting and responding when a transmit current $I_{TX}$ has been adjusted by other currently wirelessly charging chargeable devices. Method 900 begins at 902 and at block 904, PTU 504 wirelessly transmits power from a power transmitting element at a first level sufficient to provide power to one or more chargeable devices (PRUs) positioned within a charging region of the power transmitting element. At block 906, PTU 504 detects a subsequent chargeable device (PRU) positioned within the charging region. At block 908, PTU 504 adjusts the current from the first level to a default level prior to communication with the subsequent chargeable device.

As stated, the default level enables all compatible chargeable devices placed throughout the charging region to communicate with the device. The current may be adjusted, e.g., by controller 515, to the default level for a period of time sufficient to enable the subsequent chargeable device to communicate with PTU 504. The one or more chargeable devices and the subsequent chargeable device may communicate with the PTU 504 using one or more wireless communication interface industry standards including a BLUETOOTH low energy (BLE) interface through a BLE interface 525. Also, detecting in block 906 may include load sensing of the current to the power transmitting element.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. The described functionality may be implemented in varying ways for each particular application, but such implementation decisions may not be interpreted as causing a departure from the scope of the embodiments.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The blocks of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor may read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above may also be included within the scope of computer readable media. The processor and the storage medium may reside in an ASIC.

For purposes of summarizing the disclosure, certain aspects, advantages and novel features have been described herein. Not necessarily all such advantages may be achieved in accordance with any particular embodiment. Thus, the aspects may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope. Thus, the present aspects are not intended to be limited to the embodiments shown herein but are to be accorded the widest scope consistent with the principles and novel features disclosed herein.

What is claimed is:

1. A device for wireless power transfer, the device comprising:
   a power transmitting element configured to use a current at a first level to wirelessly transmit power sufficient to provide power to one or more chargeable devices positioned within a charging region; and
   a controller operationally coupled to the power transmitting element and configured to:
      adjust the current to a default level in response to detecting the one or more chargeable devices;
      adjust the current to the first level from the default level, the first level being different from the default level;
      detect a subsequent chargeable device positioned within the charging region while the current is at the first level;
      adjust the current, in response to detecting the subsequent chargeable device, from the first level to the default level prior to communication with the subsequent chargeable device; and
      adjust the current to a second level different from the default level to charge the one or more chargeable devices and to charge the subsequent chargeable device.

2. The device for wireless power transfer of claim 1, wherein the default level enables chargeable devices placed throughout the charging region sufficient power to power communication circuitry of the one or more chargeable devices to communicate with the device.

3. The device for wireless power transfer of claim 1, wherein the controller is configured to sense changes in a load presented to the power transmitting element to detect the subsequent chargeable device, the changes in the load indicative of the subsequent chargeable device positioned within the charging region.

4. The device for wireless power transfer of claim 1, wherein the controller is configured to detect a change in impedance presented to the power transmitting element above a threshold to detect the subsequent chargeable device.

5. The device for wireless power transfer of claim 1, wherein the controller is configured to adjust the current to the default level for a period of time sufficient to enable the subsequent chargeable device to communicate with the device.

6. The device for wireless power transfer of claim 5, wherein the controller is configured to adjust the current, following the period of time, to the second level based on capabilities of the one or more chargeable devices and the subsequent chargeable device.

7. The device for wireless power transfer of claim 6, wherein the controller is configured to adjust the current to the second level based on one or more industry standards including the AIRFUEL ALLIANCE standard Wireless Power Transfer System Baseline System Specification Version 1.3.

8. The device for wireless power transfer of claim 1, further comprising a BLUETOOTH low energy (BLE) interface configured to communicate with the one or more chargeable devices and the subsequent chargeable device.

9. The device for wireless power transfer of claim 1, wherein the first level is one of less than the default level or greater than the default level.

10. The device for wireless power transfer of claim 1, wherein the first level of the current is insufficient to enable the subsequent chargeable device to communicate with the device with the one or more chargeable devices positioned within a charging region.

11. The device for wireless power transfer of claim 1, wherein the first level corresponds to a level different than the default level, the controller is configured to determine the first level in response to one of the one or more chargeable devices requesting a change in power prior to the subsequent chargeable device being positioned within the charging region.

12. The device for wireless power transfer of claim 1, wherein the controller is further configured to periodically transmit power, prior to the subsequent chargeable device and prior to any of the one or more chargeable devices being positioned within the charging region, at a level lower than a level of power transferred based on the current at the first level and at the default level and to determine an impedance change, the impedance change indicative of the one or more chargeable devices being positioned within the charging region.

13. The device for wireless power transfer of claim 1, wherein the default level is fixed at a predetermined level that is independent from feedback from the one or more chargeable devices.

14. The device for wireless power transfer of claim 1, wherein the controller is configured to decrease the current from the default level to the second level such that the second level has a more efficient value than the default level to charge the one or more chargeable devices and to charge the subsequent chargeable device.

15. A method for wireless power transfer comprising:
wirelessly transmitting power from a power transmitting element, using a current at a first level, sufficient to provide power to one or more chargeable devices positioned within a charging region of the power transmitting element;
adjusting the current to a default level in response to detecting the one or more chargeable devices;
adjusting the current to the first level from the default level, the first level being different from the default level;
detecting a subsequent chargeable device positioned within the charging region while the current is at the first level;
adjusting the current, in response to detecting the subsequent chargeable device, from the first level to the default level prior to communication with the subsequent chargeable device; and
adjusting the current to a second level different from the default level to charge the one or more chargeable devices and to charge the subsequent chargeable device.

16. The method for wireless power transfer of claim 15, wherein the default level enables chargeable devices placed throughout the charging region to communicate with a device wirelessly transmitting the power.

17. The method for wireless power transfer of claim 15, wherein the detecting the subsequent chargeable device includes load sensing of the current used by the power transmitting element.

18. The method for wireless power transfer of claim 15, further comprising adjusting the current to the default level for a period of time sufficient to enable the subsequent chargeable device to communicate with a device wirelessly transmitting the power.

19. The method for wireless power transfer of claim 18, further comprising, following the period of time, adjusting the current to the second level based on capabilities of the one or more chargeable devices and the subsequent chargeable device.

20. The method for wireless power transfer of claim 19, wherein the adjusting the current to the second level is based on one or more industry standards including the AIRFUEL ALLIANCE standard Wireless Power Transfer System Baseline System Specification Version 1.3.

21. The method for wireless power transfer of claim 15, further comprising a device wirelessly transmitting the power communicating with the one or more chargeable devices and the subsequent chargeable device using a BLUETOOTH low energy (BLE) interface.

22. The method for wireless power transfer of claim 15, wherein the first level is one of less than the default level or greater than the default level.

23. The method for wireless power transfer of claim 15, wherein the first level of the current is insufficient to enable the subsequent chargeable device to communicate with a device wirelessly transmitting the power with the one or more chargeable devices positioned within a charging region.

24. The method for wireless power transfer of claim 15, wherein the first level corresponds to a level different than the default level, the method further comprising determining the first level in response to one of the one or more chargeable devices requesting a change in power prior to the subsequent chargeable device being positioned within the charging region.

25. The method for wireless power transfer of claim 15, further comprising:
transmitting a plurality of impedance-determining pulses into the charging region prior to any of the one or more chargeable devices or the subsequent chargeable devices being positioned within the charging region, the impedance-determining pulses providing insufficient power to charge the one or more chargeable devices; and
determining an impedance change during transmission of the plurality of impedance determining pulses.

26. The method for wireless power transfer of claim 25, further comprising transmitting a start-up-charge pulse providing power for the one or more chargeable devices to power-up communication circuitry in response to the impedance change.

27. An apparatus for wireless power transfer, the apparatus comprising:

means for wirelessly transmitting power, using a current at a first level, sufficient to provide power to one or more chargeable devices positioned within a charging region;

means for adjusting the current to a default level in response to detecting the one or more chargeable devices;

means for adjusting the current to the first level from the default level, the first level being different from the default level;

means for detecting a subsequent chargeable device positioned within the charging region while the current is at the first level;

means for adjusting the current, in response to detecting the subsequent chargeable device, from the first level to the default level prior to communication with the subsequent chargeable device; and means for adjusting the current to a second level different from the default level to charge the one or more chargeable devices and to charge the subsequent chargeable device.

28. The apparatus for wireless power transfer of claim 27, wherein the default level enables chargeable devices placed throughout the charging region to communicate with the apparatus.

29. The apparatus for wireless power transfer of claim 27, wherein means for adjusting are for adjusting the current to the default level for a period of time sufficient to enable the subsequent chargeable device to communicate with the apparatus.

30. A non-transitory computer-readable medium including computer-executable instructions thereon, the computer-executable instructions comprising instructions for:

wirelessly transmitting power from a power transmitting element, using a current at a first level, sufficient to provide power to one or more chargeable devices positioned within a charging region of the power transmitting element;

adjusting the current to a default level in response to detecting the one or more chargeable devices;

adjusting the current to the first level from the default level, the first level being different from the default level;

detecting a subsequent chargeable device positioned within the charging region while the current is at the first level;

adjusting the current, in response to detecting the subsequent chargeable device, from the first level to the default level prior to communication with the subsequent chargeable device; and adjusting the current to a second level different from the default level to charge the one or more chargeable devices and to charge the subsequent chargeable device.

31. The non-transitory computer-readable medium of claim 30, wherein the default level enables chargeable devices placed throughout the charging region to communicate with a device wirelessly transmitting the power.

* * * * *